United States Patent
Donovan et al.

(10) Patent No.: US 7,193,627 B1
(45) Date of Patent: Mar. 20, 2007

(54) TRILINEAR OPTIMIZATION FOR TEXTURE FILTERING

(75) Inventors: Walter E. Donovan, Saratoga, CA (US); Paul S. Heckbert, Pittsburgh, PA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/294,840

(22) Filed: Dec. 5, 2005

Related U.S. Application Data

(62) Division of application No. 10/631,399, filed on Jul. 31, 2003, now Pat. No. 6,995,767.

(51) Int. Cl.
  *G09G 5/00* (2006.01)
  *G06T 17/00* (2006.01)
(52) U.S. Cl. .................. 345/428; 345/582; 345/587
(58) Field of Classification Search .......... 345/428, 345/581–588, 606–610
See application file for complete search history.

(56) References Cited

U.S. PATENT DOCUMENTS

| | | | |
|---|---|---|---|
| 6,184,894 B1 | 2/2001 | Rosman et al. | |
| 6,452,603 B1 * | 9/2002 | Dignam | 345/582 |
| 6,756,989 B1 | 6/2004 | Morgan, III et al. | |

OTHER PUBLICATIONS

Lance Williams, "Pyramidal Parametrics" Computer Graphics (SIGGRAPH 1983 Proceedings) vol. 17, No. 3 Jul. 1983, pp. 1-11.

* cited by examiner

*Primary Examiner*—Matthew Luu
(74) *Attorney, Agent, or Firm*—Patterson & Sheridan, L.L.P.

(57) ABSTRACT

Trilinear optimization is a technique to reduce the number of texture samples used to determine a texture value associated with a graphics fragment. Bilinear interpolations replace some trilinear interpolations, thereby reducing the number of texture samples read and simplifying the filter computation. A programmable trilinear slope is used to control replacement of a trilinear computation with a bilinear computation, permitting a user to determine a balance between improved texture map performance and texture filtering quality.

12 Claims, 7 Drawing Sheets

TRILINEAR OPTIMIZATION FOR TEXTURE FILTERING

CROSS-REFERENCE TO RELATED APPLICATIONS

This application is a divisional of, and claims priority benefit of, U.S. patent application Ser. No. 10/631,399, filed on Jul. 31, 2003 now U.S. Pat. No. 6,995,767.

FIELD OF THE INVENTION

One or more aspects of the invention generally relate to computer graphics, and more particularly to filtering texture map data.

BACKGROUND

Conventional graphics processors are exemplified by systems and methods developed to read and filter texture map samples. To simplify the texture map filtering performed within a graphics processor, a texture is prefiltered and various resolutions of the prefiltered texture are stored as mip mapped texture maps. FIG. 1 is a conceptual diagram of prior art showing a mip mapped texture including a highest resolution texture map, Texture Map 101. A Texture Map 102, a Texture Map 103, and a Texture Map 104 are successively lower resolution texture maps, each storing prefiltered texture samples, e.g., mip maps as mentioned in *Pyramidal Parametrics*, Lance Williams, Computer Graphics (SIGGRAPH '83 Proceedings), vol. 17, no. 3, July 1983, pp. 1–11.

When a texture map is applied to a pixel, a conventional graphics processor typically performs trilinear interpolation, first selecting two texture maps to read texture samples from, such as Texture Map 101 and Texture Map 102. The conventional graphics processor reads four texels (texture map samples), Texels 110 from Texture Map 101 and four texels, Texels 115 from Texture Map 102. A bilinear interpolation is performed using Texels 110 and another bilinear interpolation is performed using Texels 115. The result of each bilinear interpolation is then interpolated to produce a final filtered texture sample which is used to determine a color for the pixel.

Trilinear interpolation results in a high-quality image; however eight texture samples are read and processed to produce each filtered texture sample. Bilinear interpolation results in a lower quality image, but only requires reading four samples from one texture map and performing a bilinear interpolation to produce each filtered texture sample. Point sampling, i.e. reading a single texture sample from a texture map as each filtered texture sample, results in an even lower quality image. In general, producing a higher-quality image requires reading more texture samples and performing more complex operations to produce each filtered texture sample. Therefore texture sample filtering performance decreases as image quality improves, due to limited bandwidth available for reading texture samples stored in memory and limited computational resources within a graphics processor.

Accordingly, there is a need to balance performance of texture sample filtering with image quality to minimize image quality degradation for a desired level of texture sample filtering performance.

SUMMARY

The current invention involves new systems and methods for performing trilinear optimization during texture mapping. Some trilinear interpolations are replaced with bilinear interpolations, thereby reducing the number of texture samples read and simplifying texture sample filtering computations. A programmable trilinear slope is used to control replacement of a trilinear computation with a bilinear computation, permitting a user to determine a balance between improved texture map performance and texture filtering quality.

Various embodiments of a method of the invention include computing an optimized level of detail (LOD) value for texture map filtering. A level of detail value for a texture map is received. A positive or negative bias is added to a level of detail value to produce a biased level-of detail value, including an integer portion and a fractional portion. A modified fractional portion is computed using the fractional portion. The modified fractional portion is combined with the integer portion to produce the optimized level of detail value.

Various embodiments of a method of the invention include approximating a trilinear texture map filtering computation. A level of detail value is received. An optimized level of detail value including a fractional portion and an integer portion is computed using the level of detail value. The fractional portion is used to determine if the level of detail value is outside of a transition band. Texture samples are read from a texture map corresponding to the integer portion.

Various embodiments of the invention include a trilinear optimization unit for computing an optimized level of detail value. The trilinear optimization unit includes a level of detail optimization unit and a storage element. The level of detail optimization unit is configured to receive a level of detail value and a predetermined trilinear optimization value and produce the optimized level of detail value. The storage element is coupled to the level of detail optimization unit and stores the predetermined trilinear optimization value.

Various embodiments of the invention include a programmable graphics processor for generating images using filtered texture samples. The programmable graphics processor includes a texture unit configured to receive texture parameters and compute a filtered texture sample. The texture unit includes a trilinear optimization unit configured to compute an optimized level of detail value.

Various embodiments of the invention include a computing system. The computing system includes a host processor, a host memory, a system interface, and a graphics processor. The host memory stores programs for the host processor. The system interface is configured to interface with the host processor and the graphics processor. The graphics processor includes a texture unit configured to receive texture parameters and compute a filtered texture sample. The texture unit includes a trilinear optimization unit configured to compute an optimized level of detail value using one or more of the texture parameters.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In conventional graphics processors each prefiltered texture map is associated with a LOD (level of detail) value, e.g. the highest resolution map having an LOD value of 0 and successively lower resolution maps having incremented LOD values. In an alternate embodiment the LOD ordering is reversed with the lowest resolution map (1×1) having an LOD value of 0. An LOD value includes an integer portion (i) and a fractional portion. The LOD value is computed from a texture footprint dimension. One way of doing this is to compute an accurate logarithm base 2 of the footprint dimension, and another, more approximate technique, uses the bits of the footprint dimension after the leading 1 as the fraction and the amount of shift as the integer. The integer portion specifies two texture maps to use for trilinear texture mapping. The first texture map is associated with an LOD value of i. The second texture map is associated with an LOD value of i+1. The fractional portion specifies the weight used for the linear interpolation portion of the trilinear filtering computation. When the fractional portion is equal to 0, the lower resolution texture map is not used and bilinear interpolation (of texels from the higher resolution texture map) may be used to produce a filtered texture sample without any quality degradation compared with trilinear interpolation. In some embodiments, an LOD is computed once per fragment, e.g., per pixel, in other embodiments, it may be computed more occasionally, such as once per block of pixels, once per row or column, once per polygon, once per object, or the like.

Figure 1:
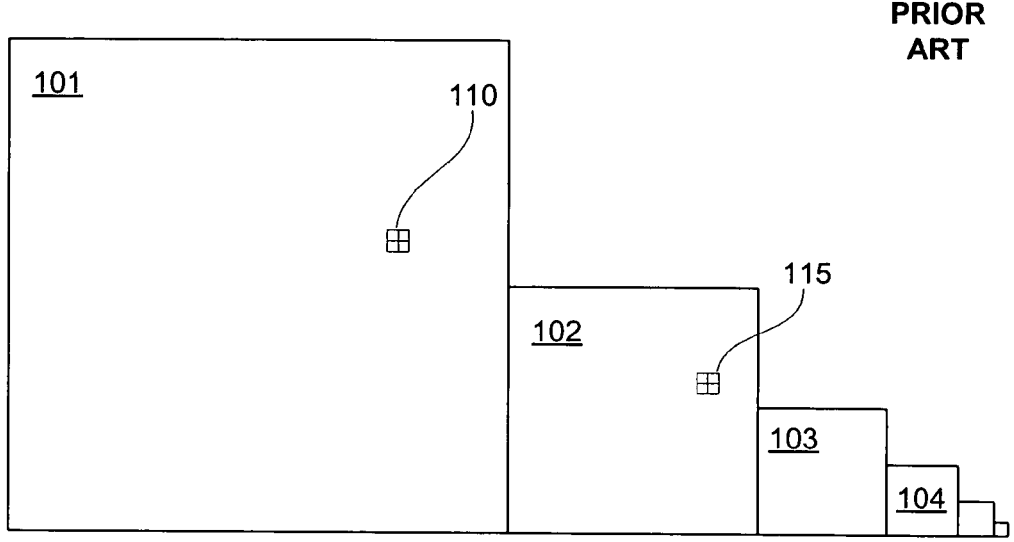
FIG. 1 is a conceptual diagram of prior art showing a mip mapped texture.
Figure 2A:
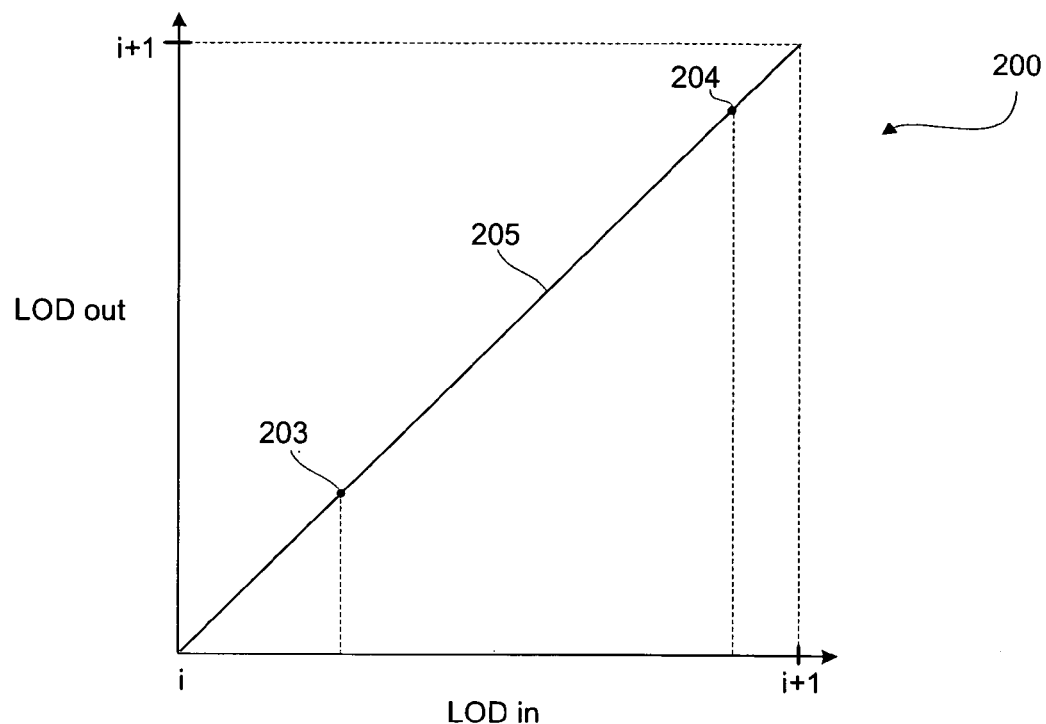
FIGS. 2A and 2B illustrate optimized LOD functions in accordance with one or more aspects of the present invention.

FIG. 2A illustrates an optimized LOD function in accordance with one or more aspects of the present invention that performs conventional trilinear texture filtering. The horizontal axis of a Graph 200 represents an input LOD ranging in value from i to i+1. The vertical axis of Graph 200 represents an output LOD, optimized LOD, ranging in value from i to i+1. When conventional trilinear texture filtering is performed, a linear function represented by a Line 205 does not modify an input LOD value to produce an optimized LOD value. For example, Point 203 corresponds to an input LOD close to i, such that the fractional portion is small. As Point 203 moves towards the origin along Line 205, the contribution of a texture map associated with an LOD value of i+1 to the filtered texture sample diminishes. Likewise, Point 204 corresponds to an input LOD close to i+1, such that the fractional portion is large. As Point 204 moves away from the origin along Line 205, the contribution of a texture map associated with an LOD value of i to the filtered texture sample diminishes.

Figure 2B:
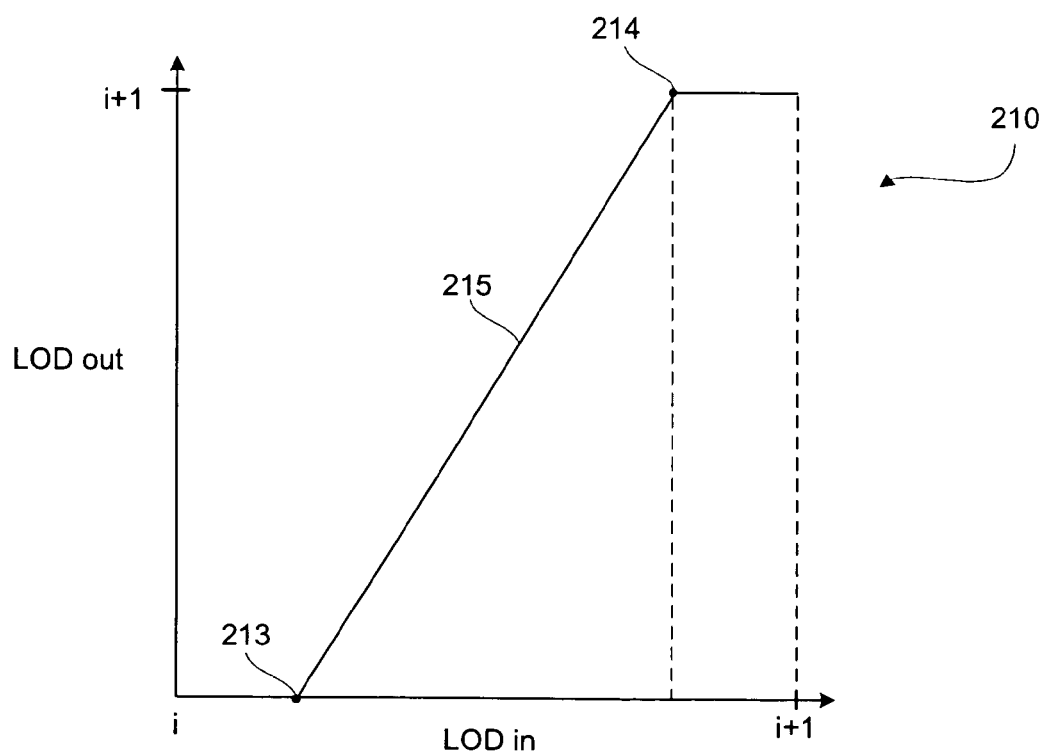

FIG. 2B illustrates a portion of another optimized LOD function in accordance with one or more aspects of the present invention. This optimized LOD function performs trilinear optimization by "snapping" LOD values to integers when the fractional portion of the LOD is close to either 0 or 1. The horizontal axis of a Graph 210 represents an input LOD ranging in value from i to i+1. The vertical axis of Graph 210 represents an output LOD, optimized LOD, ranging in value from i to i+1. When an input LOD is less than or equal to a value of LOD in at Point 213, the optimized LOD is set to a value of i. Likewise, when an input LOD is greater than or equal to a value of LOD in at Point 214, the optimized LOD is set to a value of i+1. A C0 continuous function is represented by a Line 215 that results in some filtered texture samples to be computed using a bilinear interpolation instead of a trilinear interpolation. Specifically, fewer filtered texture samples are computed using trilinear interpolation than when the function represented in FIG. 2A is used (assuming a uniform distribution of LOD in values). The complete mapping of LOD in to LOD out using this function would look like a ziggurat, with horizontal "terraces" at integer output values and slopes between them.

The result of using the function represented by Line 215 to compute optimized LOD values is that some pixels of a textured surface, are computed using bilinear interpolation and the remaining pixels are within "transition bands" and are computed using trilinear interpolation. Specifically, a textured, receding plane will have narrower transition bands, and between the transition bands, bands of pixels computed using bilinear interpolation. The transition bands correspond to LOD in values between Points 213 and 214 on Line 215, resulting in optimized LOD values with non-zero fractional portions. Trilinear optimization may be used to compute optimized LOD values for cubemaps (used for cubic environment mapping), one-dimensional textures, two-dimensional textures, or three-dimensional textures, or other mip mapped textures. Furthermore, trilinear optimization is useful for isotropic filtering and for anisotropic filtering. Specifically, when anisotropic filtering is performed using multiple trilinear interpolations trilinear optimization may be used for each trilinear interpolation.

Figure 3A:
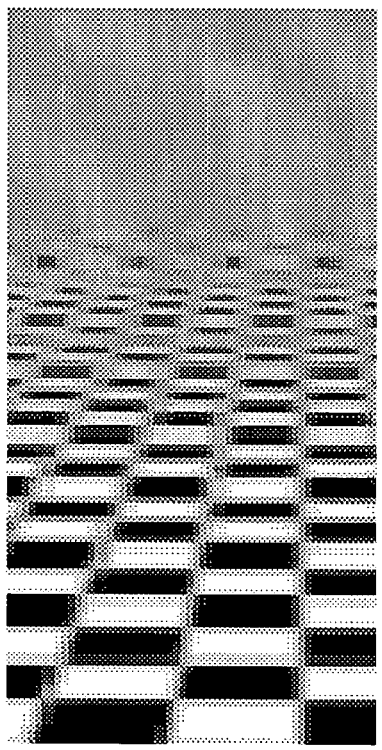
FIG. 3A illustrates an image generated using a trilinearly interpolated texture map.
Figure 3B:
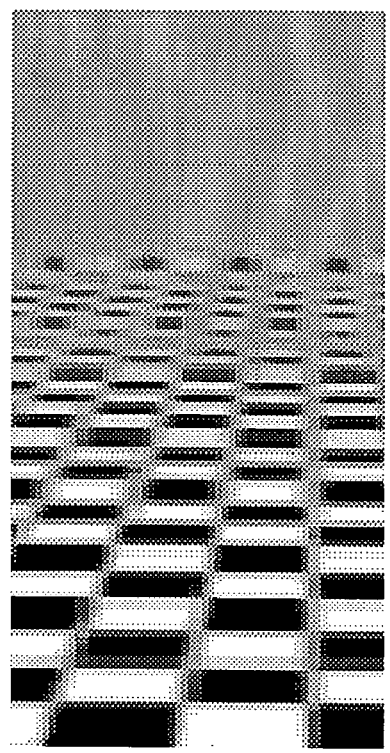
FIG. 3B illustrates an image generated using an optimized LOD function in accordance with one or more aspects of the present invention.
Figure 3C:
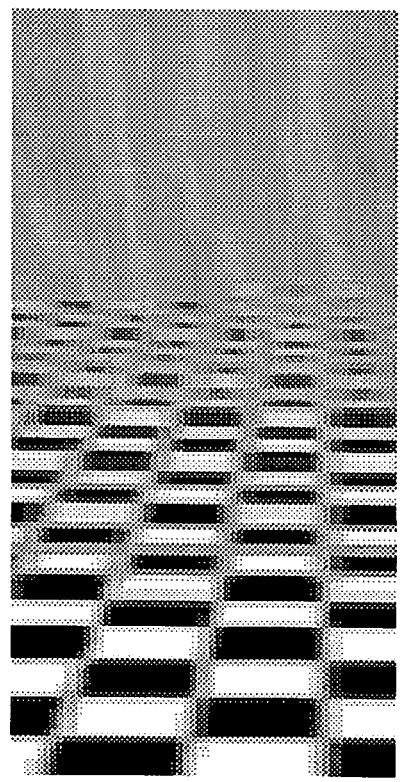
FIG. 3C illustrates an image generated using a bilinearly interpolated texture map.

FIG. 3A illustrates an image generated using a trilinearly interpolated texture map. FIG. 3B illustrates an image generated using an optimized LOD function in accordance with one or more aspects of the present invention. Specifically, a trilinear slope, to be described further herein, of 4 is used to determine the transition band boundaries. Note that the quality of the image shown in FIG. 3B is nearly as good as FIG. 3A even though some trilinearly filtered texture samples have been replaced with bilinearly filtered texture samples. FIG. 3C illustrates an image generated using a bilinearly interpolated texture map. Note that the quality of the image shown in FIG. 3C is lower (abrupt transitions from checkered to gray) than the quality of either of the images shown in FIG. 3A or FIG. 3B.

Figure 4:
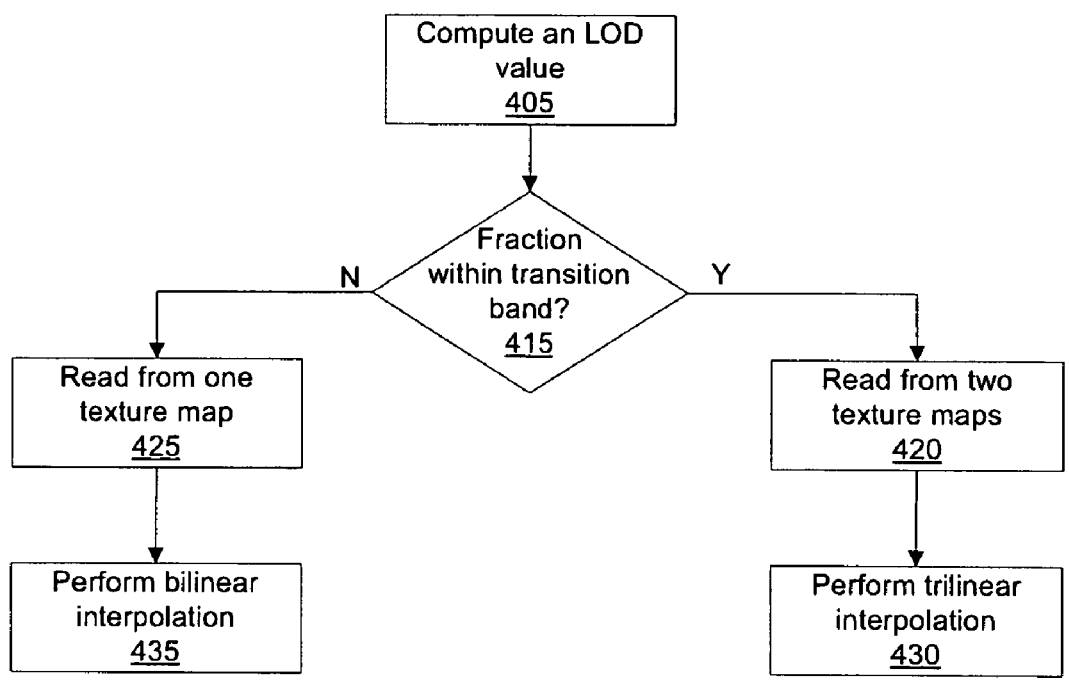
FIG. 4 illustrates an embodiment of a method of approximating trilinear filtering in accordance with one or more aspects of the present invention.

FIG. 4 illustrates an embodiment of a method of approximating trilinear filtering using trilinear optimization in accordance with one or more aspects of the present invention. In step 405 an LOD value for a pixel is computed using a technique known to those skilled in the art. In some embodiments the computed LOD value includes an LOD bias. Typically the LOD bias is a signed value that may be specified by an application or software driver. In one embodiment the LOD bias ranges in value from −1 to +1. The computed LOD value includes an integer portion and a fractional portion. In step 415 the fractional portion of the computed LOD value is evaluated, and, if the fractional portion is within a transition band, in step 420 four texels are read from each of two texture maps (the texture maps associated with an LOD of i and i+1). In step 430 four texels from one of the two texture maps are bilinearly interpolated, four texels from the other of the two texture maps are bilinearly interpolated, and the results are linearly interpolated using the fractional portion of the computed LOD, thereby computing a trilinear interpolation to produce a filtered texture sample.

If, in step 415 the fractional portion of the computed LOD value is evaluated and determined to be outside of the transition band, in step 425 four texels are read from one texture map, the one texture map corresponding to the integer portion of the computed LOD value. In step 435 the four texels are bilinearly interpolated to produce a filtered texture sample.

When the transition band includes fractional portions (fractional LOD values) ranging from 0.25 to 0.75, for example, bilinear interpolation will be used to produce half of the filtered texture samples, assuming a uniform distribution of fractional portions. Therefore the cost, in terms of clock cycles or memory bandwidth (used to read texels) is 75% of the cost of conventional trilinear filtering (shown in FIG. 2A). A user may program the transition band boundaries balancing improved performance (clock cycles or memory bandwidth) against image quality. In an alternate embodiment a driver may program the transition band based on a user performance mode selection, e.g., fastest, compromise, high quality, and the like. Furthermore, the transition band boundaries may be predetermined or programmed for each texture, i.e. associated with a texture ID (identifier).

Figure 5:
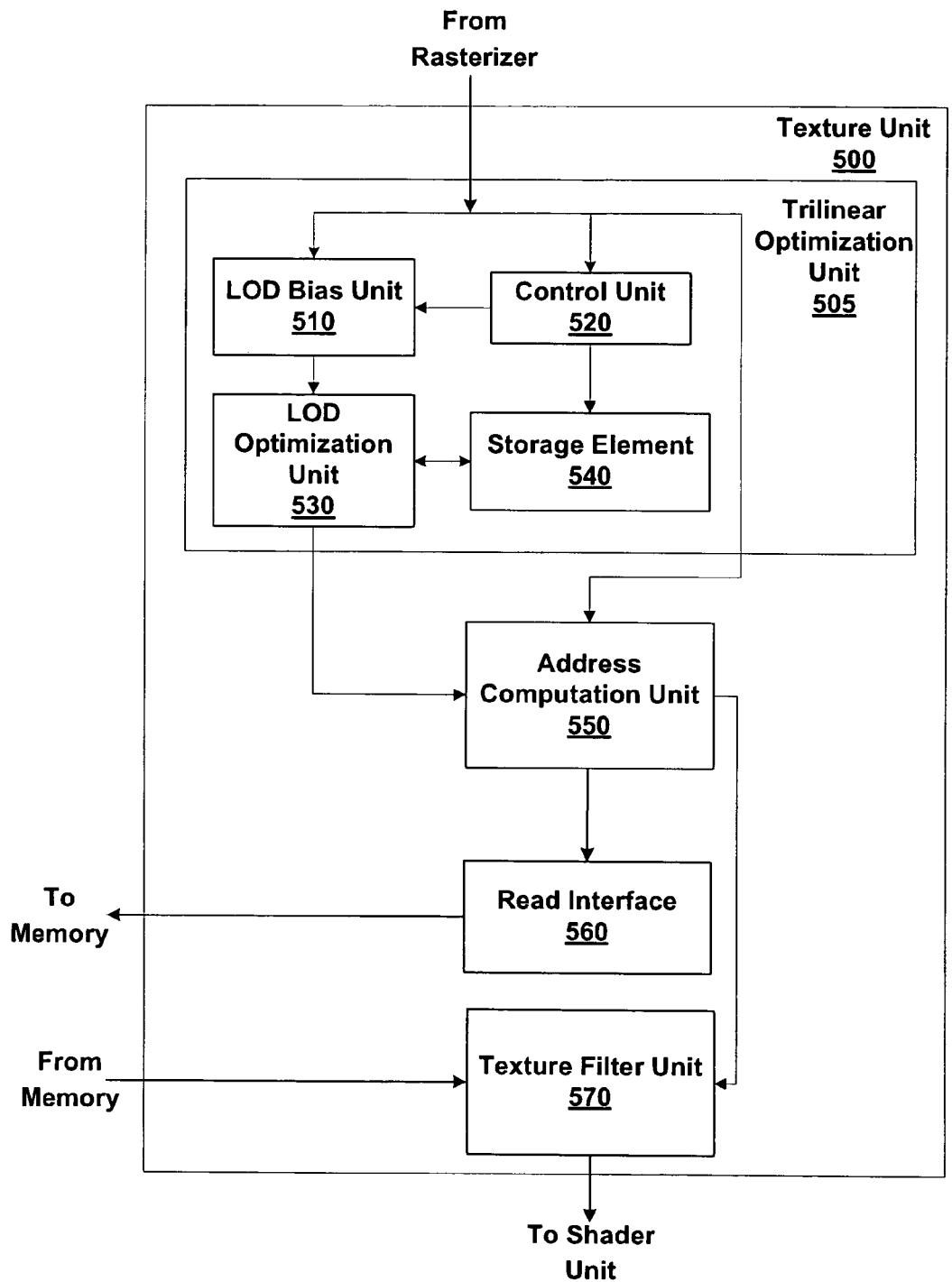
FIG. 5 is a block diagram of a portion of a shader unit including a texture unit in accordance with one or more aspects of the present invention.

FIG. 5 is a block diagram of a portion of a graphics processing pipeline, to be described further herein, including a Texture Unit 500 in accordance with one or more aspects of the present invention. In some embodiments Texture Unit 500 receives data from a rasterizer, e.g., program instructions, and parameters associated with fragments (LOD values, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments.

Texture Unit 500 includes a Trilinear Optimization Unit 505. A Control Unit 520 within Trilinear Optimization Unit 505 processes the program instructions, such as instructions to load transition band boundary values into a Storage Element 540. Storage Element 540 includes registers, or the like. Control Unit 520 may also load LOD bias values into an LOD Bias Unit 510. Just as transition band boundary values may correspond to a specific texture, LOD bias values may also correspond to a specific texture. LOD Bias Unit 510 applies an LOD bias to each LOD value, for example by summing an LOD value with the LOD bias value to produce a biased LOD value. In an alternate embodiment, LOD Bias Unit 510 also computes each LOD value, using a technique known to those skilled in the art.

Biased LOD values are output by LOD Bias Unit 510 to an LOD Optimization Unit 530 within Trilinear Optimization Unit 505. LOD Optimization Unit 530 computes optimized LOD values for trilinear optimization using biased LOD values and transition band boundary values. In some embodiments, the transition band boundary values are determined using a "trilinear slope" and LOD Optimization Unit 530 is configured to produce optimized LOD values using this equation:

optimized LOD=integer_portion+min
((fraction_portion*trilinear_slope), 1), where integer_portion is the integer portion of a biased LOD value, fraction_portion is the fractional portion of a biased LOD value, and trilinear_slope is a trilinear slope.

In an embodiment the trilinear slope is represented as a 5 bit floating point number (with an implied leading one), with a 3 bit fraction and 2 bit exponent. In the embodiment the trilinear slope may represent 1, 1.125, 1.25, 1.375, 1.5, 1.625, 1.75, 1.875, 2, 2.25, 2.75, 3, 3.25, 3.5, 3.75, 4, 4.5, 5, 5.5, 6, 6.5, 7, 7.5, 8, 9, 10, 11, 12, 13, 14, or 15. LOD Optimization Unit 530 passes a biased LOD value through unchanged when the trilinear slope is set to 1, resulting in conventional trilinear filtering for backwards compatibility.

In an alternate embodiment Storage Element 540 is a look up table containing optimized fractions read using fraction_portion. For example, the look up table may contain 32 optimized fractions, each addressed using fraction_portion (5 bits). The optimized fraction in the look up table may be fixed or loaded using program instructions. Each optimized fraction ranges in value from 0 to 1 and the optimized fractions may represent a complex function, e.g. s-shaped curve, piece-wise linear, discontinuous, or the like. Furthermore, fraction_portion may be represented with additional bits and the look up table may contain additional optimized fractions. In the alternate embodiment LOD Optimization Unit 530 sums an optimized fraction read from Storage Element 540 with integer_portion to produce an optimized LOD value.

LOD Optimization Unit 530 outputs optimized LOD values to an Address Computation Unit 550. Address Computation Unit 550 uses texture parameters (s, t, texture ID, and the like) received by Texture Unit 500 and optimized LOD values to determine addresses for reading texture samples stored in memory. Address Computation Unit 550 outputs the addresses to a Read Interface 560. Read Interface 560 outputs the addresses and a read request to a memory, e.g., cache, RAM, ROM, or the like. Texture samples read from memory are received from the memory by a Texture Filter Unit 570. Texture Filter Unit 570 receives texture parameters (fractional s and t values) and fractional portions (of optimized LOD values) from Address Computation Unit 550 and filters the texture samples read from memory using bilinear interpolation or trilinear interpolation to produce filtered texture samples. The filtered texture samples are output to a shader unit, described further herein, to compute a color for each fragment.

Figure 6A:
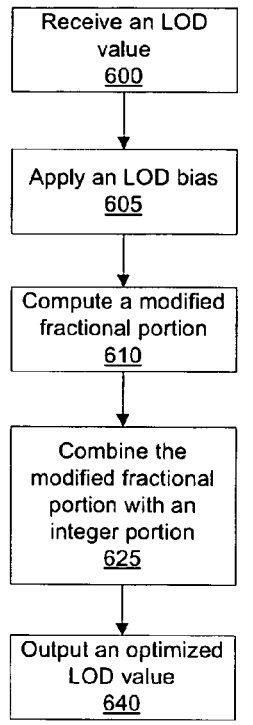
FIGS. 6A and 6B illustrate embodiments of methods of computing an optimized LOD value in accordance with one or more aspects of the present invention.

FIG. 6A illustrates an embodiment of a method of computing an optimized LOD value in accordance with one or more aspects of the present invention. In step 600 Trilinear Optimization Unit 505 receives an LOD value. In step 605 LOD Bias Unit 510 applies an LOD bias to the LOD value to produce a biased LOD value which is output to LOD Optimization Unit 530. The biased LOD value includes a fractional portion (fraction_portion) and an integer portion. In step 610 LOD Optimization Unit 530 computes a modified fractional portion, using the fractional portion and data read from Storage Element 540. In one embodiment LOD Optimization Unit 530 reads a trilinear slope (trilinear_slope) from Storage Element 540 and computes the modified fractional portion is using the trilinear slope and the fractional portion. In an alternate embodiment the modified fractional portion is read from Storage Element 540 using at least a portion of fraction_portion as an address.

In step 625 LOD Optimization Unit 530 combines the modified fractional portion with the integer portion to produce an optimized LOD value. For example, LOD Optimization Unit 530 sums the modified fractional portion with the integer portion. In step 640 LOD Optimization Unit 530 outputs the optimized LOD value.

Figure 6B:
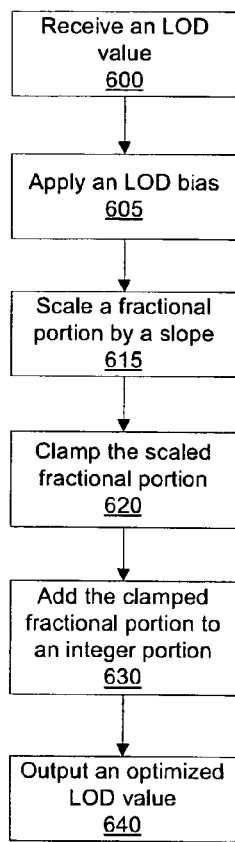
Figure 6B:
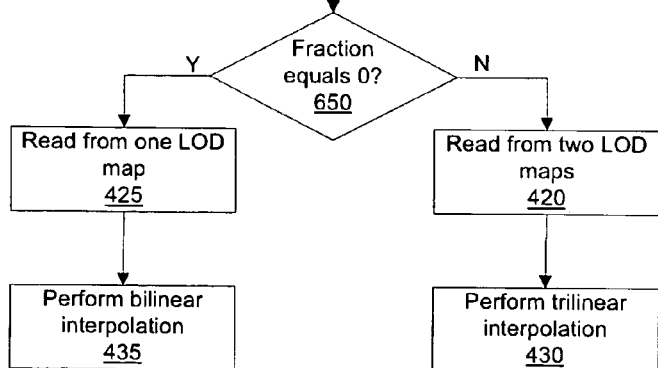

FIG. 6B illustrates an embodiment of a method of computing an optimized LOD value in accordance with one or more aspects of the present invention including some of the steps described in relation to FIG. 6A. Steps 600 and 605 proceed as previously described. In step 615 LOD Optimization Unit 530 reads a trilinear slope (trilinear_slope) from Storage Element 540 and scales fraction_portion by trilinear_slope to produce a scaled fractional portion. In step 620 LOD Optimization Unit 530 clamps the scaled fractional portion to a value of 1 if the scaled fraction portion is greater than 1, to produce a clamped fractional portion. In step 630 LOD Optimization Unit 530 sums the clamped fractional portion and the integer portion to produce the optimized LOD value, including an optimized integer portion and an optimized fractional portion. In an alternate embodiment LOD Optimization Unit 530 reads an optimized fraction, e.g. clamped fractional portion or scaled fractional portion from Storage Element 540.

In step 640 LOD Optimization Unit 530 outputs the optimized LOD value to Address Computation Unit 550. In step 650 Address Computation Unit 550 determines if the optimized fractional portion is equal to 0, and, if so, in step 425 Address Computation Unit 550 outputs one or more generated addresses to Read Interface 560. Read Interface 560 outputs a read request to memory to read four texels from one texture map, the one texture map corresponding to the optimized integer portion. In step 435 Texture Filter Unit 570 receives the four texels from memory and bilinearly interpolates the four texels to produce a filtered texture sample.

If, in step 650 Address Computation Unit 550 determines the optimized fractional portion is not equal to 0, in step 420 Address Computation Unit 550 outputs one or more generated addresses to Read Interface 560. Read Interface 560 outputs a read request to memory to read four texels from each of two texture maps (the texture maps associated with an LOD corresponding to the optimized integer portion and the optimized integer portion plus 1). In step 430 Texture Filter Unit 570 receives a set of four texels from one of the two texture maps and a set of four texels from the other of the two texture maps from memory. Texture Filter Unit 570 bilinearly interpolates each set of four texels and the results are linearly interpolated using the optimized fractional portion (to complete a trilinear interpolation using eight texels), producing a filtered texture sample.

Figure 7:
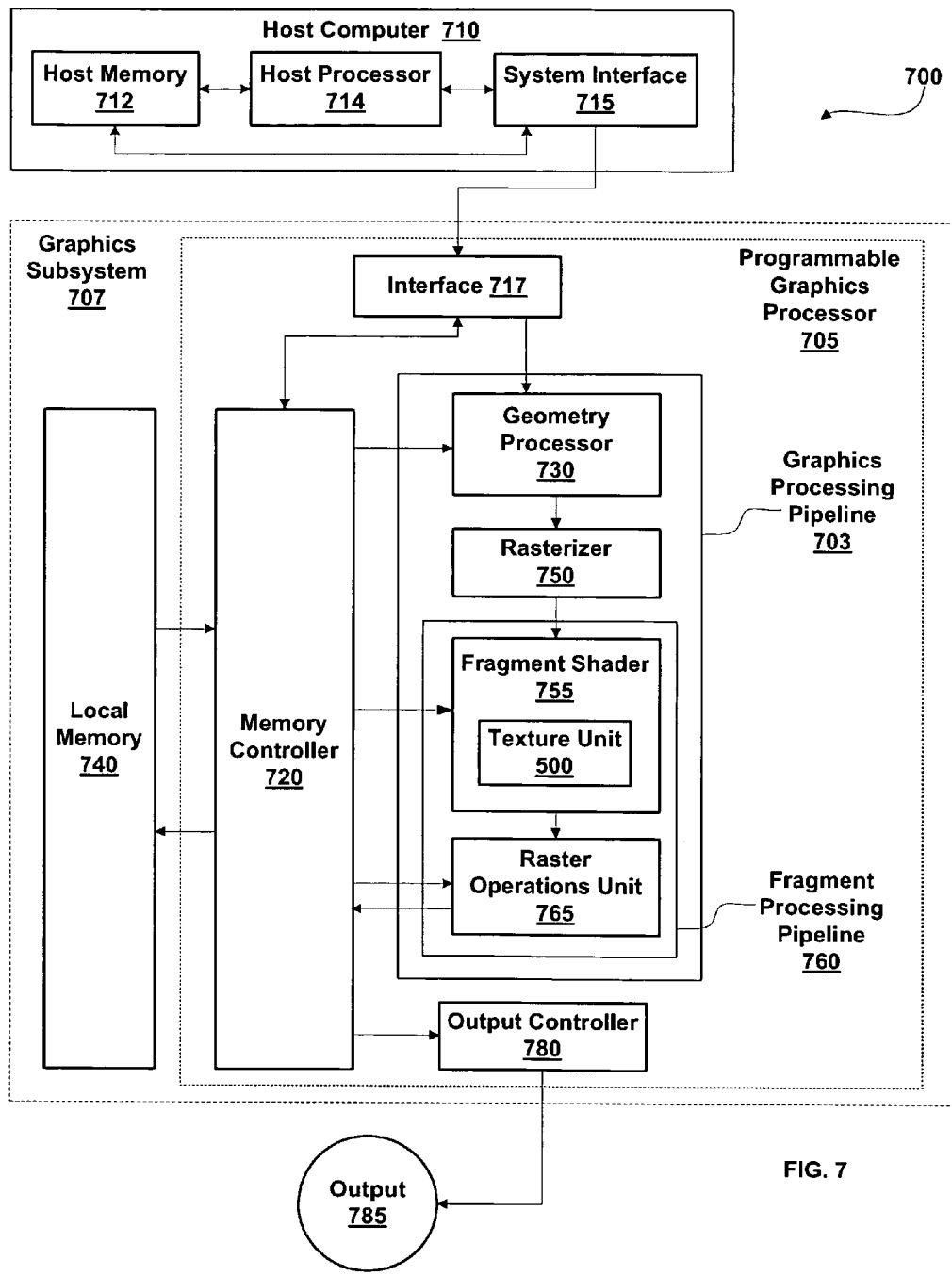
FIG. 7 is a block diagram of an exemplary embodiment of a respective computer system in accordance with one or more aspects of the present invention including a host computer and a graphics subsystem.

FIG. 7 is a block diagram of an exemplary embodiment of a Computing System generally designated 700 and including a Host Computer 710 and a Graphics Subsystem 707 including an embodiment of Texture Unit 500. Computing System 700 may be a desktop computer, server, laptop computer, palm-sized computer, tablet computer, game console, cellular telephone, computer based simulator, or the like. Host Computer 710 includes Host Processor 714 that may include a system memory controller to interface directly to Host Memory 712 or may communicate with Host Memory 712 through a System Interface 715. System Interface 715 may be an I/O (input/output) interface or a bridge device including the system memory controller to interface directly to Host Memory 712. Examples of System Interface 715 known in the art include Intel® Northbridge and Intel® Southbridge.

Host computer 710 communicates with Graphics Subsystem 707 via System Interface 715 and an Interface 717. Graphics Subsystem 707 includes a Local Memory 740 and a Programmable Graphics Processor 705. Programmable Graphics Processor 705 uses memory to store graphics data, including texture maps, and program instructions, where graphics data is any data that is input to or output from computation units within Programmable Graphics Processor 705. Graphics memory is any memory used to store graphics data or program instructions to be executed by Programmable Graphics Processor 705. Graphics memory can include portions of Host Memory 712, Local Memory 740 directly coupled to Programmable Graphics Processor 705, storage resources coupled to the computation units within Programmable Graphics Processor 705, and the like. Storage resources can include register files, caches, FIFOs (first in first out), and the like.

In addition to Interface 717, Programmable Graphics Processor 705 includes a Graphics Processing Pipeline 703, a Memory Controller 720 and an Output Controller 780. Data and program instructions received at Interface 717 can be passed to a Geometry Processor 730 within Graphics Processing Pipeline 703 or written to Local Memory 740 through Memory Controller 720. In addition to communicating with Local Memory 740, and Interface 717, Memory Controller 720 also communicates with Graphics Processing Pipeline 703 and Output Controller 780 through read and write interfaces in Graphics Processing Pipeline 703 and a read interface in Output Controller 780.

Within Graphics Processing Pipeline 705, Geometry Processor 730 and a programmable graphics fragment processing pipeline, Fragment Processing Pipeline 760, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 730 and Fragment Processing Pipeline 760 are optionally configured such that data processing operations are performed in multiple passes through Graphics Processing Pipeline 703 or in multiple passes through Fragment Processing Pipeline 760. Each pass through Programmable Graphics Processor 705, Graphics Processing Pipeline 703 or Fragment Processing Pipeline 760 concludes with optional processing by a Raster Operations Unit 765.

Vertex programs are sequences of vertex program instructions compiled by Host Processor 714 for execution within Geometry Processor 730 and Rasterizer 750. Shader programs are sequences of shader program instructions compiled by Host Processor 714 for execution within Fragment Processing Pipeline 760. Geometry Processor 730 receives a stream of program instructions (vertex program instructions and shader program instructions) and data from Interface 717 or Memory Controller 720, and performs vector floating-point operations or other processing operations using the data. The program instructions configure subunits within Geometry Processor 730, Rasterizer 750 and Fragment Processing Pipeline 760. The program instructions and data are stored in graphics memory, e.g., portions of Host Memory 712, Local Memory 740, or storage resources within Programmable Graphics Processor 705. When a portion of Host Memory 712 is used to store program instructions and data the portion of Host Memory 712 can be uncached so as to increase performance of access by Programmable Graphics Processor 705. Alternatively, configuration information is written to registers within Geometry Processor 730, Rasterizer 750 and Fragment Processing Pipeline 760 using program instructions, encoded with the data, or the like.

Data processed by Geometry Processor 730 and program instructions are passed from Geometry Processor 730 to a Rasterizer 750. Rasterizer 750 is a sampling unit that processes primitives and generates sub-primitive data, such as fragment data, including parameters associated with fragments (texture IDs, texture coordinates, and the like). Rasterizer 750 converts the primitives into sub-primitive data by performing scan conversion on the data processed by Geometry Processor 730. Rasterizer 750 outputs fragment data and shader program instructions to Fragment Processing Pipeline 760.

The shader programs configure the Fragment Processing Pipeline 760 to process fragment data by specifying computations and computation precision. Fragment Shader 755 is optionally configured by shader program instructions such that fragment data processing operations are performed in multiple passes within Fragment Shader 755. Fragment Shader 755 includes an embodiment of previously described Texture Unit 500. In one embodiment Texture Unit 500 is configured to read shader program instructions stored in Local Memory 740 or Host Memory 712 via Memory Controller 720.

In some embodiments of Computing System 700 graphics processing performance is limited by memory bandwidth, e.g. between Host Memory 712 and Programmable Graphics Processor 720, between Local Memory 740 and Graphics Processing Pipeline 703, and the like. In those embodiments using trilinear optimization to reduce the number of texture samples read from Local Memory 740 or Host Memory 712 may improve graphics processing performance. In another embodiment of Computing System 700 graphics processing performance is limited by computational resources, e.g., multipliers, adders, and the like, within Fragment Processing Pipeline 760. In that embodiment using trilinear optimization to simplify texture filtering by replacing trilinear filtering with bilinear filtering may improve graphics processing performance. In various embodiments a programmed trilinear slope or programmed modified fractional portions (of LOD values) may be used to control replacement of trilinear computations with bilinear computations during texture sample filtering, permitting a user to determine a balance between improved graphics processing performance and image quality.

Fragment Shader 755 outputs processed fragment data, e.g., color and depth, and codewords generated from shader program instructions to Raster Operations Unit 765. Raster Operations Unit 765 includes a read interface and a write interface to Memory Controller 720 through which Raster Operations Unit 765 accesses data stored in Local Memory 740 or Host Memory 712. Raster Operations Unit 765 optionally performs near and far plane clipping and raster operations, such as stencil, z test, blending, and the like, using the fragment data and pixel data stored in Local Memory 740 or Host Memory 712 at a pixel position (image location specified by x,y coordinates) associated with the processed fragment data. The output data from Raster Operations Unit 765 is written back to Local Memory 740 or Host Memory 712 at the pixel position associated with the output data and the results, e.g., image data are saved in graphics memory.

When processing is completed, an Output 785 of Graphics Subsystem 707 is provided using Output Controller 780. Alternatively, Host Processor 714 reads the image stored in Local Memory 740 through Memory Controller 720, Interface 717 and System Interface 715. Output Controller 780 is optionally configured by opcodes to deliver data to a display device, network, electronic control system, other Computing System 700, other Graphics Subsystem 707, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the trilinear optimization technique set forth herein may be implemented either partially or entirely in a software program. The foregoing description and drawings are, accordingly, to be regarded in an illustrative rather than a restrictive sense. The listing of steps in method claims do not imply performing the steps in any particular order, unless explicitly stated in the claim.

We claim:

1. A programmable graphics processor for generating images using filtered texture samples, comprising:
   a texture unit configured to receive texture parameters and compute a filtered texture sample, the texture unit including:
      a trilinear optimization unit configured to compute an optimized level of detail value for a filtered texture sample, the trilinear optimization unit having:
         a level of detail (LOD) optimization unit configured to receive a level of detail (LOD) value and a predetermined trilinear optimization value and produce the optimized level of detail value, wherein the LOD value includes a fractional portion and an integer portion, and
         a storage element coupled to the level of detail optimization unit, the storage element storing the predetermined trilinear optimization value wherein,
         the level of detail optimization unit is configured to compute a modified fractional portion using the fractional portion and the stored optimization value based on a performance mode selected by the user to determine whether a bilinear interpolation or trilinear interpolation is used for each of the texture samples.

2. The programmable graphics processor of claim 1, wherein the trilinear optimization unit further comprises a level of detail bias unit coupled to the level of detail optimization unit, the level of detail bias unit configured to apply a bias to the level of detail value.

3. The programmable graphics processor of claim 1, wherein the predetermined trilinear optimization value is a programmed trilinear slope.

4. The programmable graphics processor of claim 1, further comprising an address computation unit configured to determine one or more read addresses using at least a portion of the texture parameters and the optimized level of detail value.

5. The programmable graphics processor of claim 4, further comprising a read interface configured to receive an address and generate a read request to read one or more texture samples from memory.

6. The programmable graphics processor of claim 5, further comprising a texture filter unit configured to receive the texture samples from memory and a portion of the optimized level of detail value and produce a filtered texture sample.

7. A computing system, comprising:
a host processor;
a host memory, the host memory storing programs for the host processor;
a programmable graphics processor for generating images using filtered texture samples, comprising:
a texture unit configured to receive texture parameters and compute a filtered texture sample, the texture unit including:
a trilinear optimization unit configured to compute an optimized level of detail (LOD) value, the trilinear optimization unit having:
a level of detail optimization unit configured to receive a level of detail (LOD) value and a predetermined trilinear optimization value and produce the optimized level of detail value wherein the LOD value includes a fractional portion and an integer portion, and
a storage element coupled to the level of detail optimization unit, the storage element storing the predetermined trilinear optimization value, the optimization unit computing a modified fractional portion using the fractional portion and the stored optimization value based on a performance made selected by the user; and
a system interface configured to interface with the host processor and the programmable graphics processor.

8. The computing system of claim 7, wherein the trilinear optimization unit is configured to use a programmed trilinear slope to compute the optimized level of detail value.

9. A graphics processor as claimed in claim 1 wherein the optimization unit clamps the modified fractional portion to a value of 1 if the computed value is greater than one.

10. A graphics processor as claimed in claim 1 further comprising an address computation unit configured to respond to an optimized level of detail value of zero by reading from texels from one texture map corresponding to the integer portion to be used for bilinear interpolation to produce the filtered texture sample, and
further respond to a non-zero modified fractional portion to read a set of four texels from each of two texture maps to produce the filtered texture sample.

11. A graphics processor as claimed in claim 10 wherein the texture unit includes a texture filter unit configured to bilinearly interpolate each of the sets of four texels, and
linearly interpolate a result of the bilinear interpolation using the modified fractional portion, thereby completing a trilinear interpolation.

12. A graphics processor as claimed in claim 1 wherein the LOD value is snapped to an integer value when the modified fractional portion is close to a zero or a one.

* * * * *